(12) United States Patent
Huang

(10) Patent No.: US 7,658,394 B1
(45) Date of Patent: Feb. 9, 2010

(54) REAR SUSPENSION SYSTEM FOR BICYCLES

(76) Inventor: Stephen Huang, No. 422, Chung San Road, Ching Suei, Taichung County (TW)

( * ) Notice: Subject to any disclaimer, the term of this patent is extended or adjusted under 35 U.S.C. 154(b) by 0 days.

(21) Appl. No.: 12/385,464

(22) Filed: Apr. 9, 2009

(51) Int. Cl.
*B62K 25/26* (2006.01)
(52) U.S. Cl. ...................... 280/284; 280/288
(58) Field of Classification Search ................ 280/284, 280/283, 281.1
See application file for complete search history.

(56) References Cited

U.S. PATENT DOCUMENTS

| | | | |
|---|---|---|---|
| 5,628,524 A * | 5/1997 | Klassen et al. | 280/284 |
| 5,957,473 A * | 9/1999 | Lawwill | 280/284 |
| 6,378,885 B1 * | 4/2002 | Ellsworth et al. | 280/284 |
| 6,843,494 B2 * | 1/2005 | Lam | 280/284 |
| 7,216,883 B2 * | 5/2007 | O'Connor | 280/284 |
| 7,392,999 B2 * | 7/2008 | O'Connor | 280/284 |
| 7,467,803 B2 * | 12/2008 | Buckley | 280/283 |
| 7,494,146 B2 * | 2/2009 | Tseng | 280/284 |
| 7,556,276 B1 * | 7/2009 | Dunlap | 280/284 |
| 7,566,066 B2 * | 7/2009 | Chang et al. | 280/284 |

* cited by examiner

*Primary Examiner*—Tony H. Winner
(74) *Attorney, Agent, or Firm*—Rosenberg, Klein & Lee

(57) ABSTRACT

A rear suspension system includes a bottom bracket integrally connected between two respective first ends of two chain stays and the bottom bracket is engaged with a recess defined between two lugs on the conjunction end of the seat tube and the down tube. The chain stay unit includes two first pivot points and two second pivot points. A first link unit has a first end pivotably connected to the first pivot points and a second end of the first link unit is pivotably connected to one of the two lugs. A second link unit has a first end pivotably connected to the second pivot points and a second end of the second link unit is pivotably connected to the other one of the two lugs. The distance between the bottom bracket and the rear wheel axle is not changed when the rear suspension system is activated.

11 Claims, 9 Drawing Sheets

REAR SUSPENSION SYSTEM FOR BICYCLES

FIELD OF THE INVENTION

The present invention relates to a rear suspension system for bicycles, and more particularly, to a rear suspension system that the distance between the bottom bracket and the rear wheel axle is unchanged during operation.

BACKGROUND OF THE INVENTION

A conventional rear suspension system for bicycles is specifically designed to reduce the shocks transferred to the riders during uneven roads. The rear suspension system is deformed to absorb the shocks from the roads so that the riders have comfortable riding experienced.

The conventional rear suspension system generally includes a shock absorbing member, chain stays, seat stays and multiple link units, the rear suspension system is activated to generate relative movement between the seat tube and the rear wheel so as to reduce the shocks transferred to the riders.

The conventional rear suspension system is connected with the chain unit which generally includes a chain ring which is connected to the bottom bracket axle and a sprocket unit which is connected to the rear wheel, a chain is driven between the chain ring and one of the sprockets.

The distance between the chain ring and the sprocket decides the tension of the chain which is supposed to have a proper tension so as to transfer the force from the chain ring to the sprocket and the rear wheel. If the tension is less than required, the chain might be dropped. All the pivotable points between the bottom bracket axle and the sprocket unit affect the distance mentioned above.

One of the conventional rear suspension system 80 known to applicant is shown in FIG. 8, and generally includes a frame 81, a seat tube 811, a down tube 812, a bottom bracket 813 connected to the conjunction of the seat tube 811 and the down tube 812 and chain stays 82 which are connected between the seat tube 811 and two dropouts 821. A swing unit 83 is pivotably connected to the seat tube 811 and seat stays 84 are connected between the two dropouts 821 and the swing unit 83. A shock absorbing member 85 is located within an area enclosed by the frame 81 and has one end pivotably connected to the frame 81 and the other end is pivotably connected to the swing unit 83.

Another conventional rear suspension system 90 known to applicant is shown in FIG. 9, and generally includes a frame 91, a seat tube 911, a down tube 912, a bottom bracket 913 connected to the conjunction of the seat tube 911 and the down tube 912 and chain stays 92 which are connected between the seat tube 911 and two dropouts 921. A swing unit 93 is pivotably connected to the seat tube 911 and seat stays 94 are connected between the two dropouts 921 and the swing unit 93. A shock absorbing member 95 is located within an area enclosed by the frame 91 and has one end pivotably connected to the frame 91 and the other end is pivotably connected to the swing unit 93.

The difference between the two conventional rear suspension systems is that the dropouts 821 and the chain stays 82 of the first conventional rear suspension system is integral to each other and the seat stays 84 are located above the dropouts 821. There is only one pivotal position P1 is located between the distance "L" between the bottom bracket 813 and the dropouts 8211. When the rear wheel is moved upward and the chain stays 82 pivot about the pivotal position P1. The movement of the chain stays 82 changes the distance from "L" to "L'" which is not equal to "L". The change affects the tension of the chain.

The dropouts 921 and the chain stays 92 for the second conventional rear suspension system are pivotably connected to each other and the seat stays 94 are located beneath the dropouts 921. There are two pivotal positions "P2" and "P3", the "P2" is located at the dropouts 921 and the chain stays 92, and the "P3" is located at the chain stays 92 and the seat tube 911. When the rear wheel is moved upward, both of the two pivotal positions P2 and P3 affect the distance from "L" to "L'". The change is larger than that in the first conventional rear suspension system.

The present invention intends to provide a rear suspension system for bicycles and the distance between the bottom bracket and the rear wheel axle is maintained to be not changed so that the tension of the chain can be kept.

SUMMARY OF THE INVENTION

The present invention relates to a rear suspension system for bicycles and the device comprises a frame and a bottom bracket is connected to the conjunction end of the seat tube and the down tube. Two lugs are connected to the conjunction end and a recess is defined between the two lugs. A chain stay unit includes two chain stays and the bottom bracket is integrally connected between two respective first ends of the two chain stays. The chain stay unit includes two first pivot points and two second pivot points. A first link unit has a first end pivotably connected to the first pivot points and a second end of the first link unit is pivotably connected to one of the two lugs. A second link unit has a first end pivotably connected to the second pivot points and a second end of the second link unit is pivotably connected to the other one of the two lugs. When the rear wheel is pivoted upward, the first and second link units are moved relative to each other to reduce the shocks transferred from the ground and the distance between the bottom bracket and the rear wheel axle is maintained unchanged so as to prevent drop of the chain.

The primary object of the present invention is to provide a rear suspension system wherein the chain stay unit is a one-piece with the bottom bracket, so that the distance between the bottom bracket and the dropouts of the chain stays is fixed and does not change when the rear suspension system is activated.

Another object of the present invention is to provide a rear suspension system wherein the bottom bracket is indirectly connected to two lugs on the conjunction end of the seat tube and the down tube, so that the shocks are not transferred to the front of the bicycle.

Yet another object of the present invention is to provide a rear suspension system wherein the force that transferred to the chain stay unit can be shared by the first and second link units which are pivoted to reduce the force and the reduced force is then transferred to the bottom bracket.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
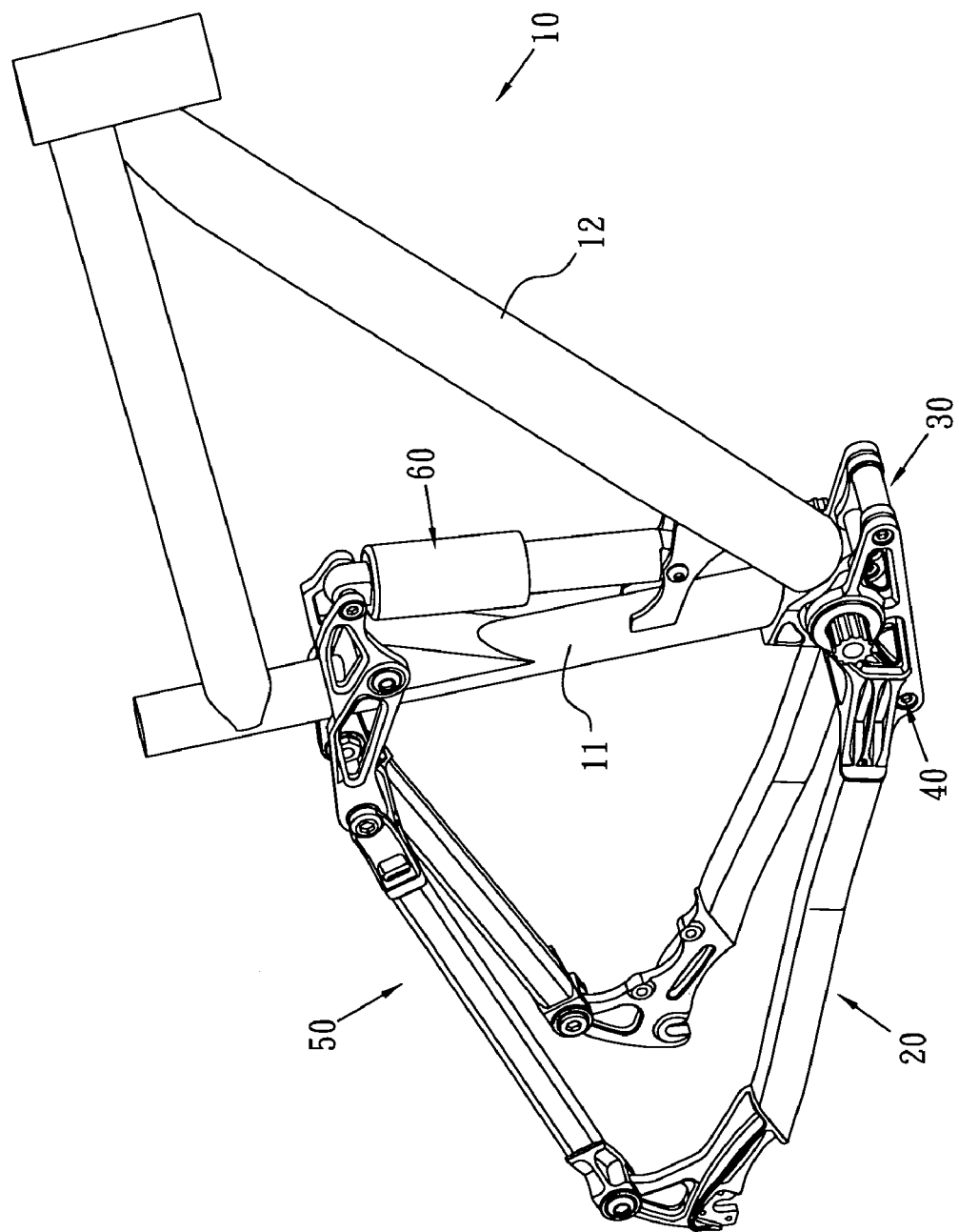
FIG. 1 is a perspective view to show the rear suspension system of the present invention.
Figure 2:
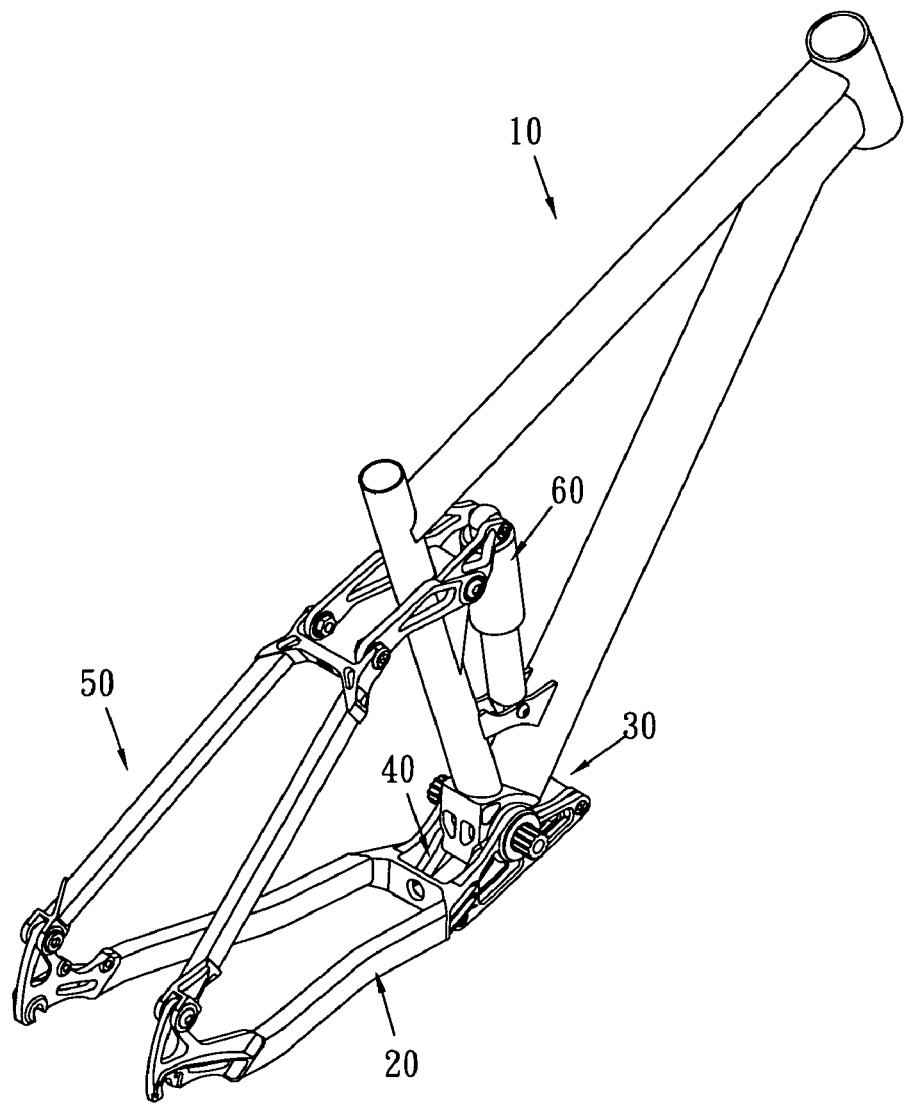
FIG. 2 is a perspective view, from another angle, to show the rear suspension system of the present invention.
Figure 3:
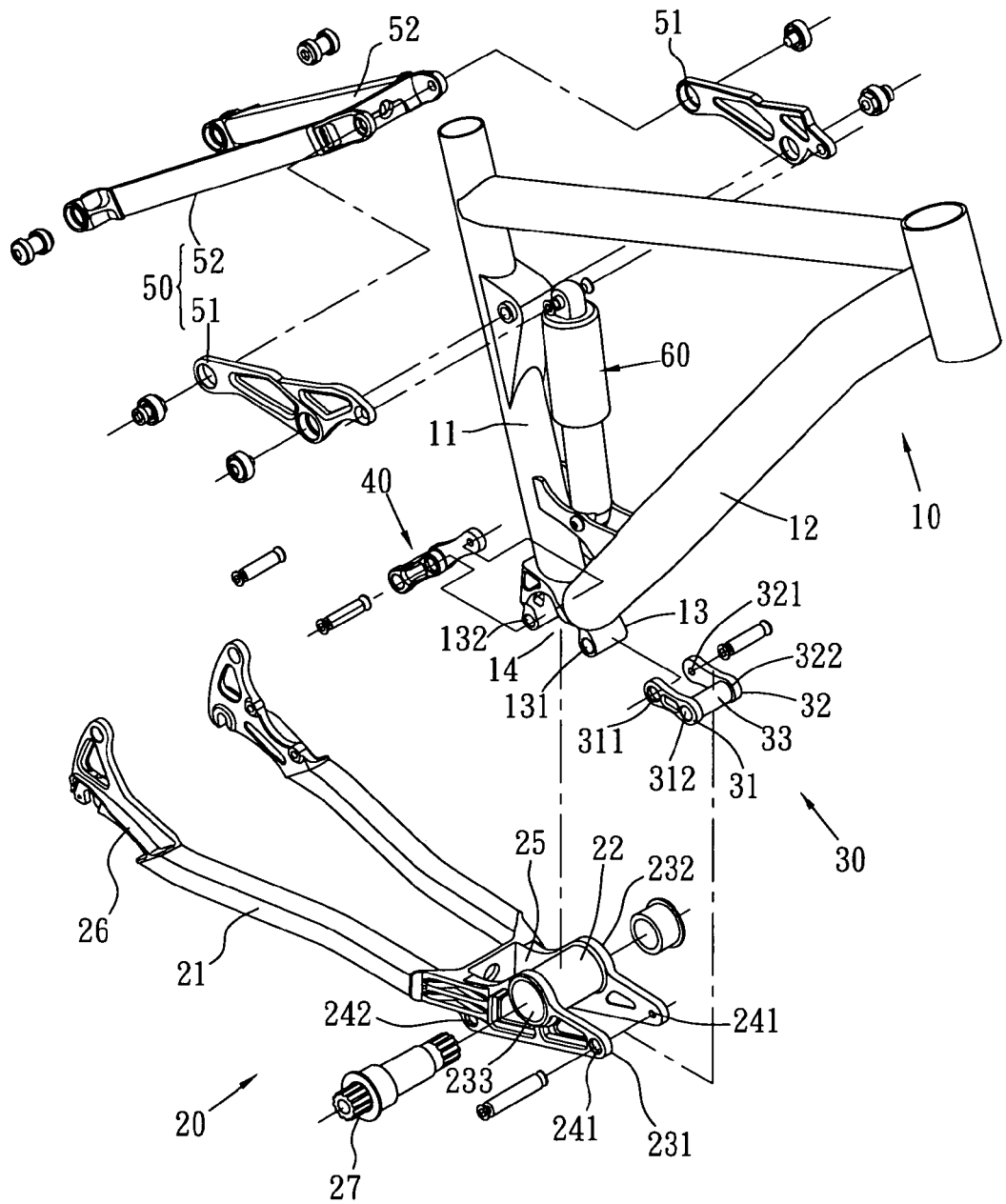
FIG. 3 is an exploded view to show the rear suspension system of the present invention.
Figure 4:
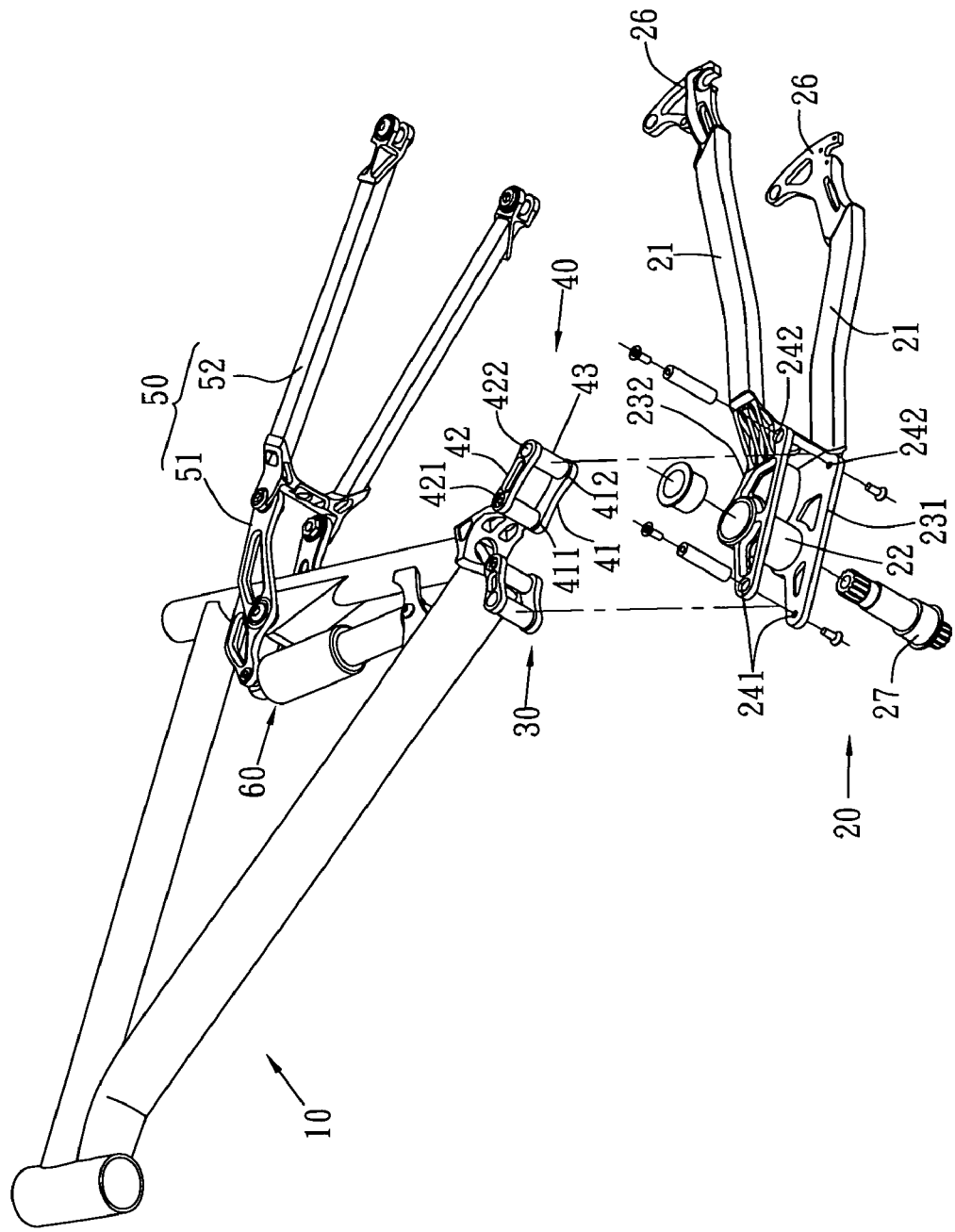
FIG. 4 is an exploded view, from another angle, to show the rear suspension system of the present invention.
Figure 5:
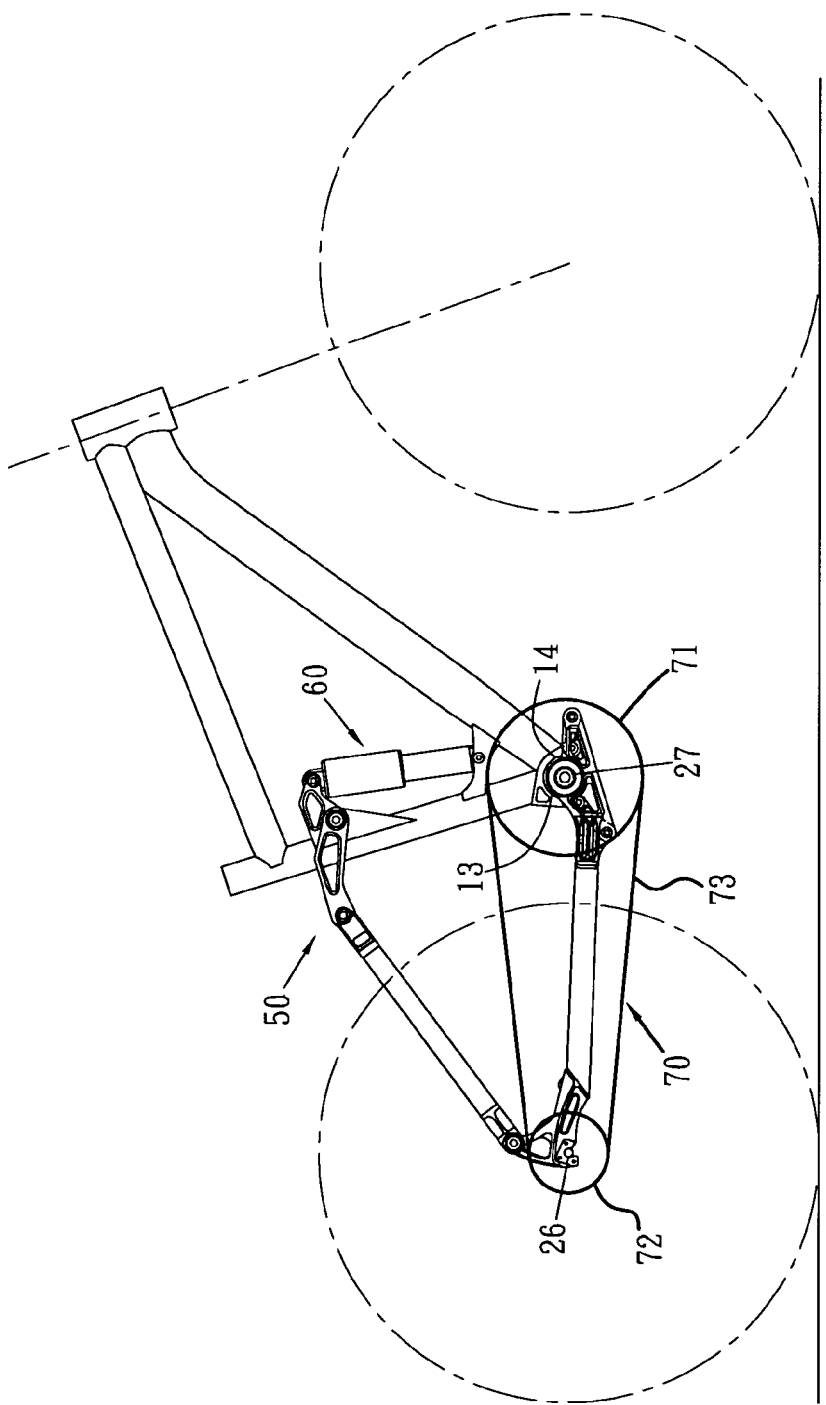
FIG. 5 shows a side view of a bicycle equipped with the rear suspension system of the present invention.
Figure 6:
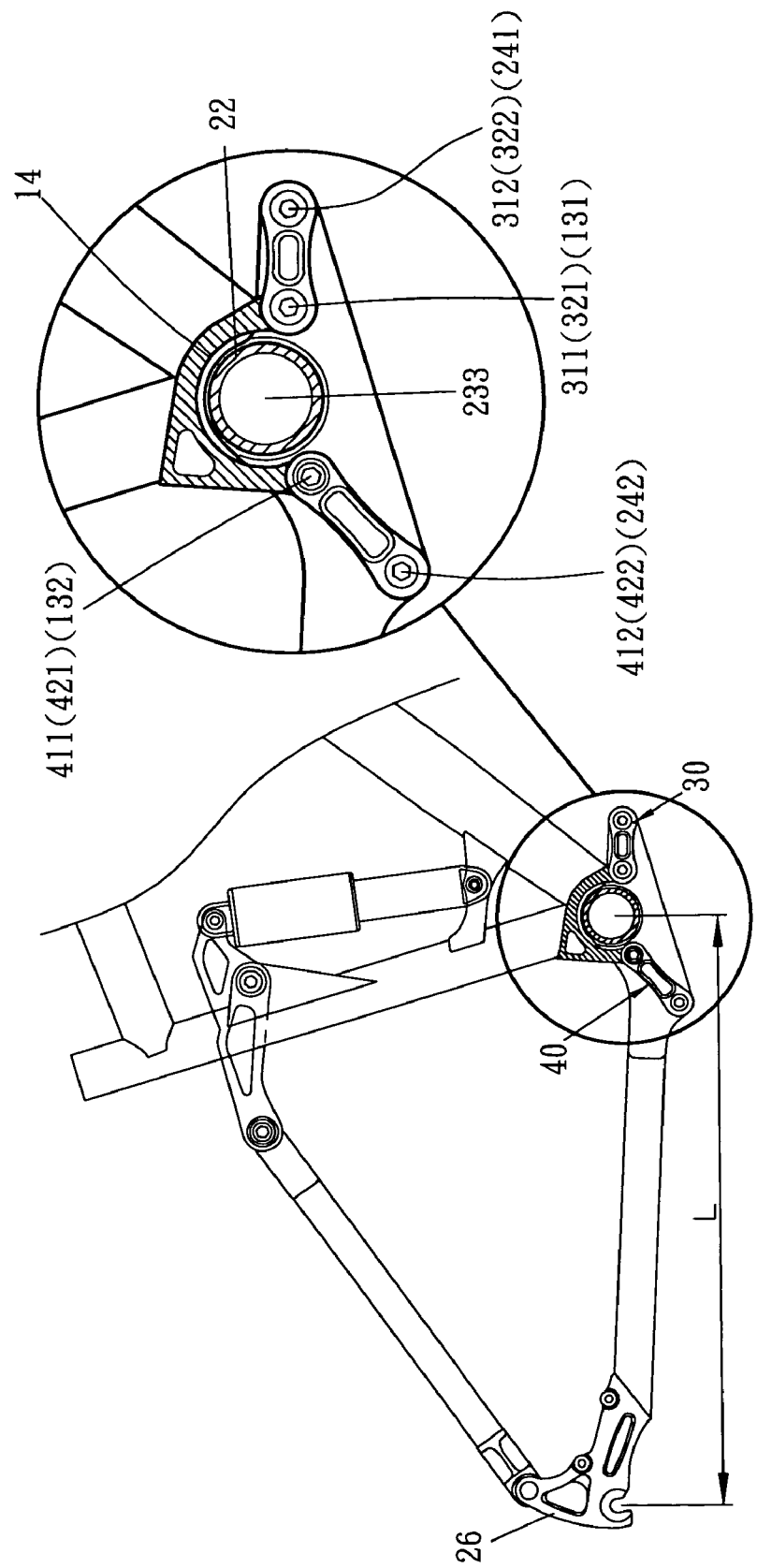
FIG. 6 is a partial cross sectional view of the connection of the two link units an the bottom bracket.

Referring to FIGS. 1 to 6, the rear suspension system of the present invention comprises a frame 10 which includes a seat tube 11, a down tube 12, a first link unit 30, a second link unit 40, a swing unit 50 and a shock absorbing member 60.

The down tube 12 is connected to the seat tube 11 at a conjunction end and two lugs 13 are connected to the conjunction end. A recess 14 is defined between the two lugs 13. A first pivot place 131 and a second pivot plate 132 are connected to the two lugs 13 respectively.

A chain stay unit 20 includes two chain stays 21 and a bottom bracket 22 is integrally connected between two respective first ends of the two chain stays 21. The bottom bracket 22 is engaged with the recess 14. The bottom bracket 22 is integrally connected between two side plates 231, 232 and a passage 233 is defined axially through the bottom bracket 22 and the two side plates 231, 232. Two first pivot points 241 are located on the first ends of the two side plates 231, 232 and two second pivot points 242 are located on the second ends of the side plates 231, 232. A space 25 is defined between the side plates 231, 232 and the bottom bracket 2, the second pivot place 132 is located in the space 25. An axle 27 is received in the passage 233 in the bottom bracket 22 and a chain ring 71 of a chain unit 70 is connected to the axle 27. Two dropouts 26 are connected to two respective second ends of the two chain stays 21 so as to be connected with a rear wheel and sprocket unit 72 of the chain unit 70. A chain 73 is driven between the chain ring 71 and one of the sprockets of the sprocket unit 72.

A first link unit 30 has a first end pivotably connected to the first pivot points 241 and a second end of the first link unit 30 is pivotably connected to one of the two lugs 13. A second link unit 40 has a first end pivotably connected to the second pivot points 242 and a second end of the second link unit 40 is pivotably connected to the other one of the two lugs 13. It is noted that the first and second link units 30, 40 are connected at an equal distance from a central axis of the bottom bracket 22.

The first link unit 30 has two first links 31, 32 and the two first links 31, 32 have two first ends 311, 321 and two second ends 312, 322. A first bar 33 is connected between the two second ends 312, 322 of the two first links 31, 32. The first bar 33 and the two second ends 312, 322 of the two first links 31, 32 are pivotably connected to the first pivot points 241. The two first ends 311, 321 of the two first links 31, 32 are pivotably connected to the first pivot place 131.

The second link unit 40 includes two second links 41, 42 and the two second links 41, 432 have two first ends 411, 421 and two second ends 412, 422. A second bar 43 is connected between the two second ends 412, 422 of the two second links 41, 42. The second bar 43 and the two second ends 412, 422 of the two second links 41, 42 are pivotably connected to the second pivot points 242. The two first ends 411, 421 of the two second links 41, 42 are pivotably connected to the second pivot place 132.

The shock absorbing member 60 has a first end pivotably connected to a bridge part connected between the seat tube 11 and the down tube 12 of the frame 10 and a second end of the shock absorbing member 60 is pivotably connected to two swing members 51 of the swing unit 50. The swing unit 50 has a first end pivotably connected to the seat tube 11. The seat stays 52 have two first ends pivotably connected to a second end of the swing unit 50 and two second ends of the seat stays 52 are pivotably connected to the dropouts 26.

Figure 7:
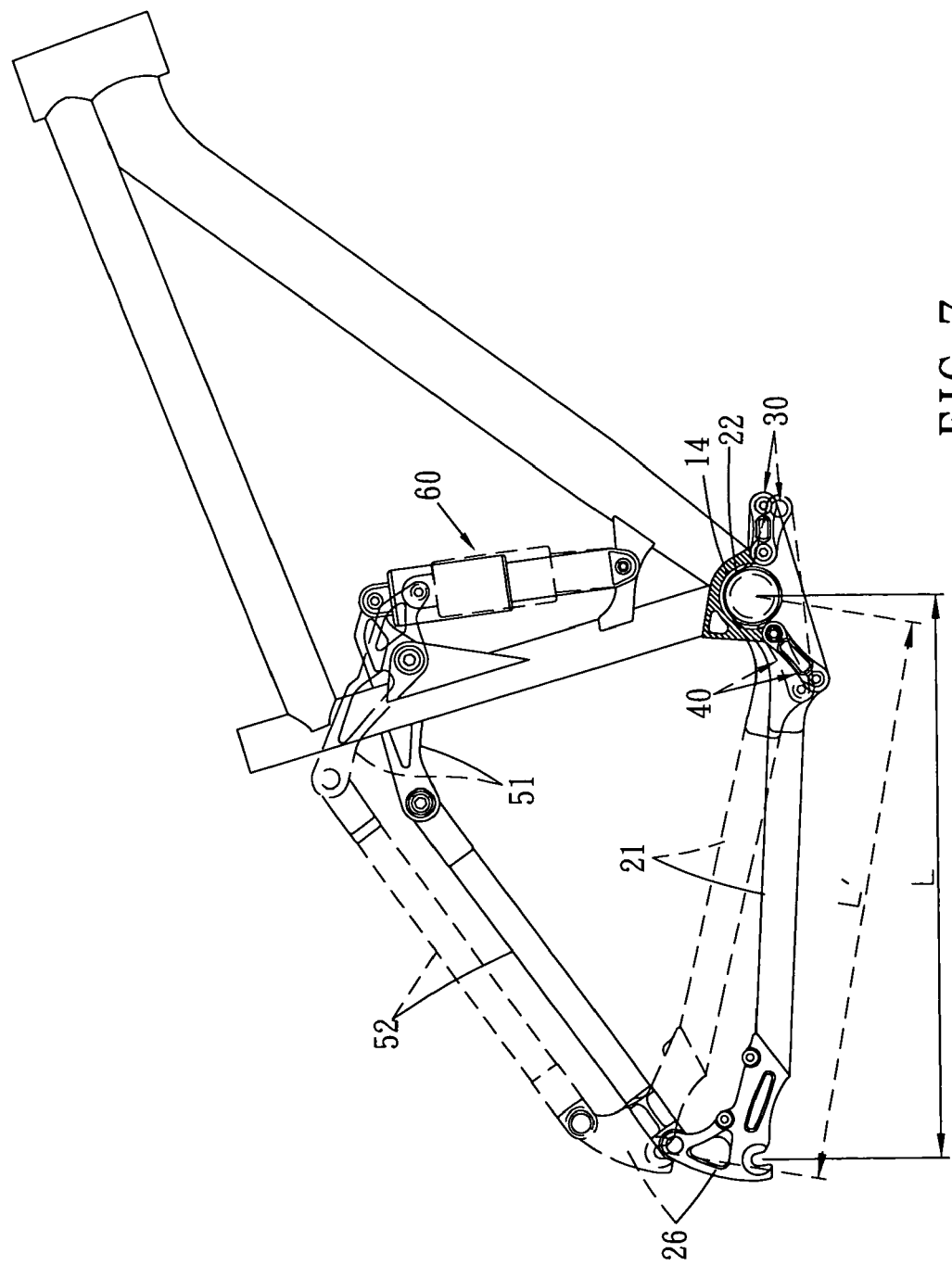
FIG. 7 shows that the distance between the bottom bracket and the dropouts of the rear suspension system of the present invention is not changed when the suspension system is activated.
Figure 8:
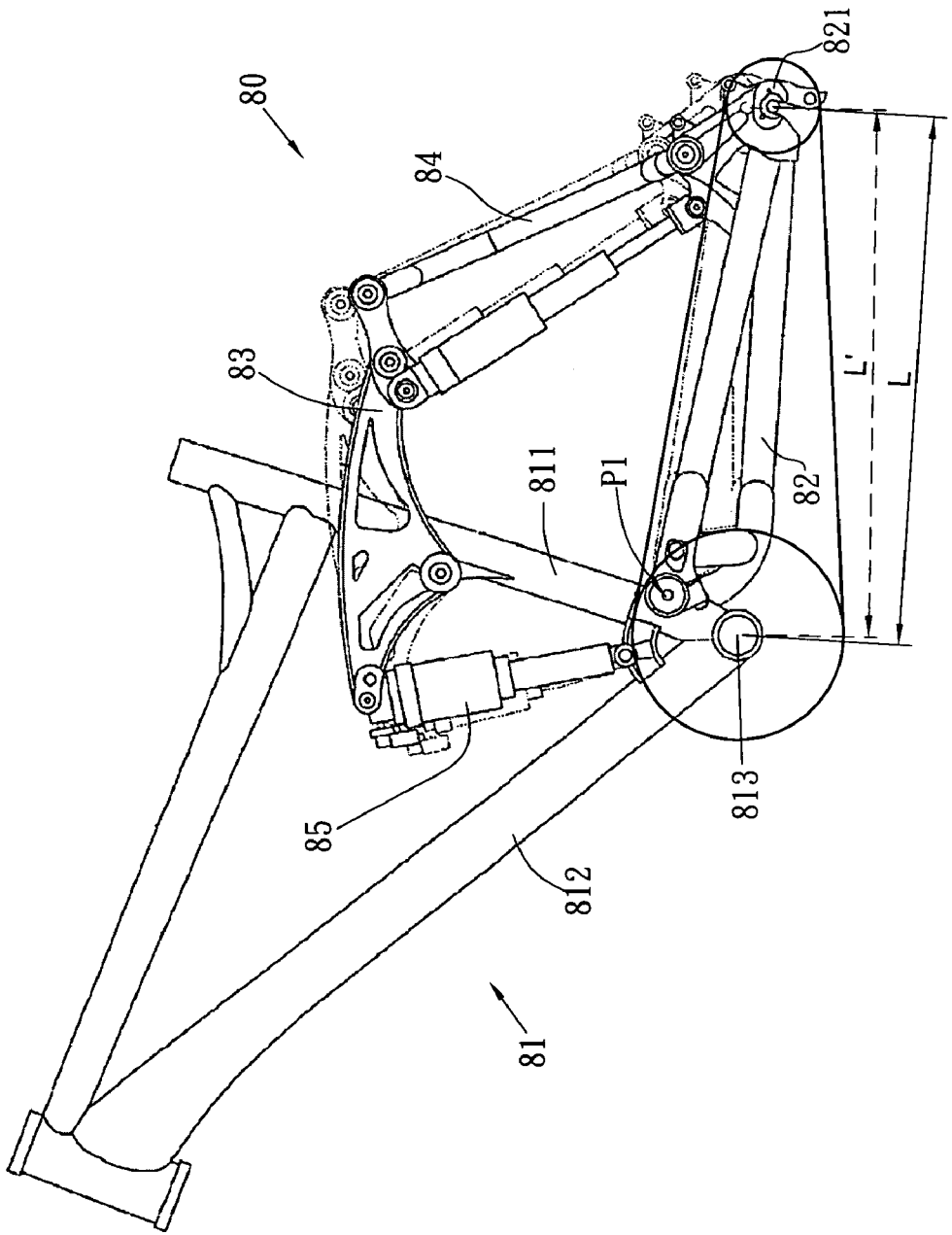
FIG. 8 shows that the distance between the bottom bracket and the dropouts of a first conventional rear suspension system is changed.
Figure 9:
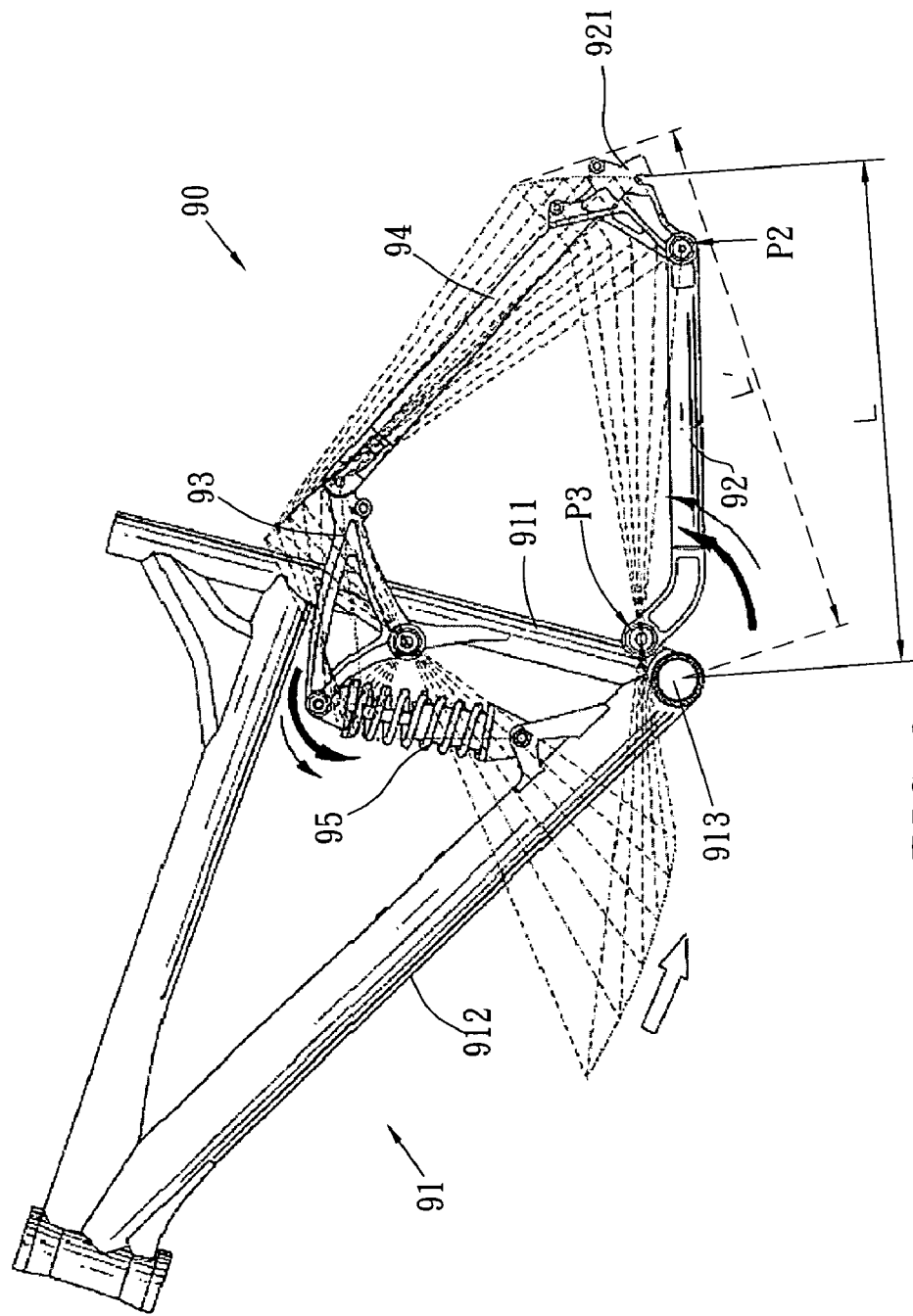
FIG. 9 shows that the distance between the bottom bracket and the dropouts of a second conventional rear suspension system is changed.

As shown in FIG. 7, when the chain stay unit 20 is pivoted, the first and second link units 30, 40 are pivoted about the first and second pivot places 131, 132. The distance "L" between the bottom bracket 22 and the dropouts 15 is not changed, so that when the rear suspension system is activated, the tension of the chain 73 is maintained so that the transmission by the chain 73 still functions well without worry of drop.

When riding on a bumped road, the rear wheel is pushed upward, chain stay unit 20 together with the sprocket unit 72 and the dropouts 26 are moved upward, the first and second link units 30, 40 are accordingly pivoted. The swing unit 50 is moved by the force transferred from the dropouts 26 so that the swing members 51 are pivoted to activate the shock absorbing member 60 to absorb the shocks. Therefore, the shocks that are transferred to the rider become much less than they are transferred to the rear wheel.

The chain stay unit 20 is a one-piece member and includes the bottom bracket 22, the chain stays 21 and the dropouts 26, so that the distance "L" between the bottom bracket 22 and the dropouts 15 is fixed. The distance "L'" between the bottom bracket 22 and the new position of the dropouts 15 after the rear wheel is moved upward is equal to the distance "L". In other words, the distance between the chain ring 71 and the sprocket unit 72 is not changed and the tension of the chain 73 remains the same. The chain 73 does not drop during the operation of the rear suspension system.

The bottom bracket 22 and the two lugs 13 are two individual designs so that the force transferred from the chain stay unit 20 does not transferred to the seat tube 11. This provides a comfortable riding to the riders and frame 10 has longer life of use.

The two separated first and second link units 30, 40 are respectively connected to the two lugs 13 so as to share the force transferred from the chain stay unit 20 by pivoting actions. The force is reduced by the pivoting actions and then transferred to the lugs 13 via the first and second pivot points 241, 242.

The space 25 is defined between the side plates 231, 232 and the bottom bracket 22 so as to receive the second pivot place 132, this saves room when assembling the chain stay unit 20 to the frame 10. The recess 14 between the two lugs 13 can be facing upward or downward or laterally when needed.

While we have shown and described the embodiment in accordance with the present invention, it should be clear to those skilled in the art that further embodiments may be made without departing from the scope of the present invention.

What is claimed is:

1. A rear suspension system comprising:

a frame having a seat tube, a down tube which is connected to the seat tube at a conjunction end and two lugs connected to the conjunction end, a recess defined between the two lugs;

a chain stay unit including two chain stays and a bottom bracket integrally connected between two respective first ends of the two chain stays, the bottom bracket engaged with the recess, the chain stay unit including two first pivot points and two second pivot points;

a first link unit having a first end pivotably connected to the first pivot points and a second end of the first link unit pivotably connected to one of the two lugs, and a second link unit having a first end pivotably connected to the second pivot points and a second end of the second link unit pivotably connected to the other one of the two lugs.

2. The system as claimed in claim 1, wherein two dropouts are connected to two respective second ends of the two chain stays so as to be connected with a rear wheel and sprocket unit, a distance between the bottom bracket and the dropouts is not changed when the chain stay unit is pivoted and activates the first and second link units.

3. The system as claimed in claim 1, wherein the first and second link units are connected at an equal distance from a central axis of the bottom bracket.

4. The system as claimed in claim 1, wherein a first pivot place and a second pivot place are connected to the two lugs respectively, the first link unit have two first links and the second link unit have two second links, the two first links have two first ends and two second ends, the two second links have two first ends and two second ends.

5. The system as claimed in claim 4, wherein the first link unit includes a first bar connected between the two second ends of the two first links, the first bar and the two second ends of the two first links are pivotably connected to the first pivot points, the two first ends of the two first links are pivotably connected to the first pivot place.

6. The system as claimed in claim 4, wherein the second link unit includes a second bar connected between the two second ends of the two second links, the second bar and the two second ends of the two second links are pivotably connected to the second pivot points, the two first ends of the two second links are pivotably connected to the second pivot place.

7. The system as claimed in claim 1, wherein the bottom bracket has an axle received therein and a chain ring is connected to the axle.

8. The system as claimed in claim 1, wherein a shock absorbing member has a first end pivotably connected to the frame and a second end of the shock absorbing member is pivotably connected to two swing members of a swing unit, the swing unit has a first end pivotably connected to the seat tube, seat stays have first ends pivotably connected to a second end of the swing unit and second ends of the seat stays are pivotably connected to the dropouts.

9. The system as claimed in claim 1, wherein the two lugs have a first pivot place and a second pivot place connected thereto respectively, the recess is located between the first and second pivot places.

10. The system as claimed in claim 1, wherein the bottom bracket of the chain stay unit are integrally connected to two side plates and a passage is defined axially through the bottom bracket and the two side plates, the first pivot points and the second pivot points are located on the two side plates.

11. The system as claimed in claim 10, wherein the two lugs have the first pivot place and the second pivot places, a space is defined between the side plates and the bottom bracket, the second pivot place is located in the space.

* * * * *